(12) United States Patent
Chen et al.

(10) Patent No.: US 12,702,936 B2
(45) **Date of Patent: *Aug. 11, 2026**

(54) INTERACTIVE ELECTRONIC TOY SYSTEM

(71) Applicant: FLYCATCHER CORP LTD, London (GB)

(72) Inventors: Shay Chen, Neve Yarak (IL); Shachar Limor, Givat Shapira (IL)

(73) Assignee: Flycatcher Corp LTD, London (GB)

( * ) Notice: Subject to any disclaimer, the term of this patent is extended or adjusted under 35 U.S.C. 154(b) by 282 days.

This patent is subject to a terminal disclaimer.

(21) Appl. No.: 18/433,582

(22) Filed: Feb. 6, 2024

(65) Prior Publication Data

US 2024/0307793 A1 Sep. 19, 2024

Related U.S. Application Data

(63) Continuation-in-part of application No. 17/612,619, filed as application No. PCT/IB2020/055005 on May 27, 2020, now Pat. No. 11,925,875.

(60) Provisional application No. 62/853,079, filed on May 27, 2019.

(51) Int. Cl.

| | |
|---|---|
| ***A63H 3/00*** | (2006.01) |
| ***A63H 33/00*** | (2006.01) |
| ***G06F 3/0346*** | (2013.01) |
| ***G09B 5/00*** | (2006.01) |
| ***G09B 17/00*** | (2006.01) |
| *A63F 9/24* | (2006.01) |

(52) U.S. Cl.

CPC ........... *A63H 33/00* (2013.01); *G06F 3/0346* (2013.01); *G09B 5/00* (2013.01); *G09B 17/003* (2013.01); *A63F 2009/2402* (2013.01)

(58) Field of Classification Search

None

See application file for complete search history.

(56) References Cited

U.S. PATENT DOCUMENTS 6,146,146 A * 11/2000 Koby-Olson ............ G09B 5/06 434/167

6,601,850 B1 * 8/2003 Ross .................. A63F 3/00643 273/273

2005/0153765 A1 * 7/2005 Shoostine .............. A63F 9/183 463/9

2009/0096159 A1 * 4/2009 Kenney .................... A63F 1/06 273/460

(Continued)

*Primary Examiner* — Jason T Yen

(74) *Attorney, Agent, or Firm* — Michael J. Feigin, Esq.; Feigin and Fridman LLC

(57) ABSTRACT

An interactive electronic toy and a method for providing a challenge to a user using the toy. The toy includes a housing and a plurality of buttons, each button associated with at least one illuminator and with at least one pressure sensor. The method includes receiving a selection of a specific challenge, said specific challenge being selected from a challenge repository associated with the interactive electronic toy, and providing to the user instructions for completing said specific challenge. The method further includes receiving a challenge response from the user, in which the user responds to said specific challenge by at least one of moving the housing of the interactive electronic toy and depressing at least one of the plurality of buttons, providing feedback to the user, based on said received challenge response.

19 Claims, 4 Drawing Sheets

(56) References Cited

U.S. PATENT DOCUMENTS

2012/0058809 A1* 3/2012 Neveaux ............ A63F 3/00643
463/11

* cited by examiner

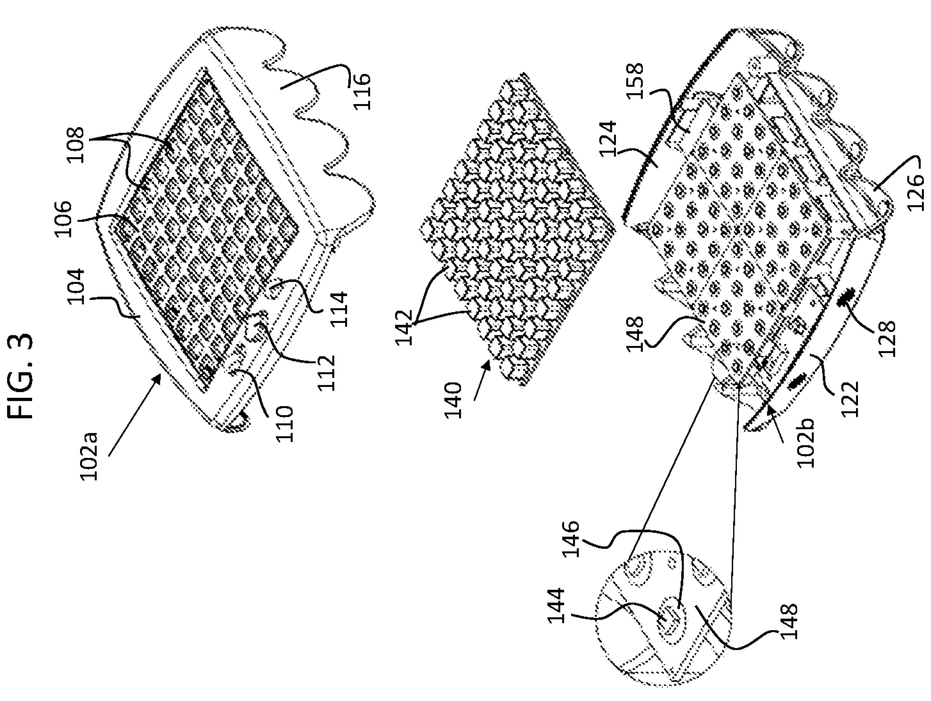
FIG. 3
102a
104
106
108
116
110
112
114
140
142
124
158
126
148
128
122
102b
146
144
148
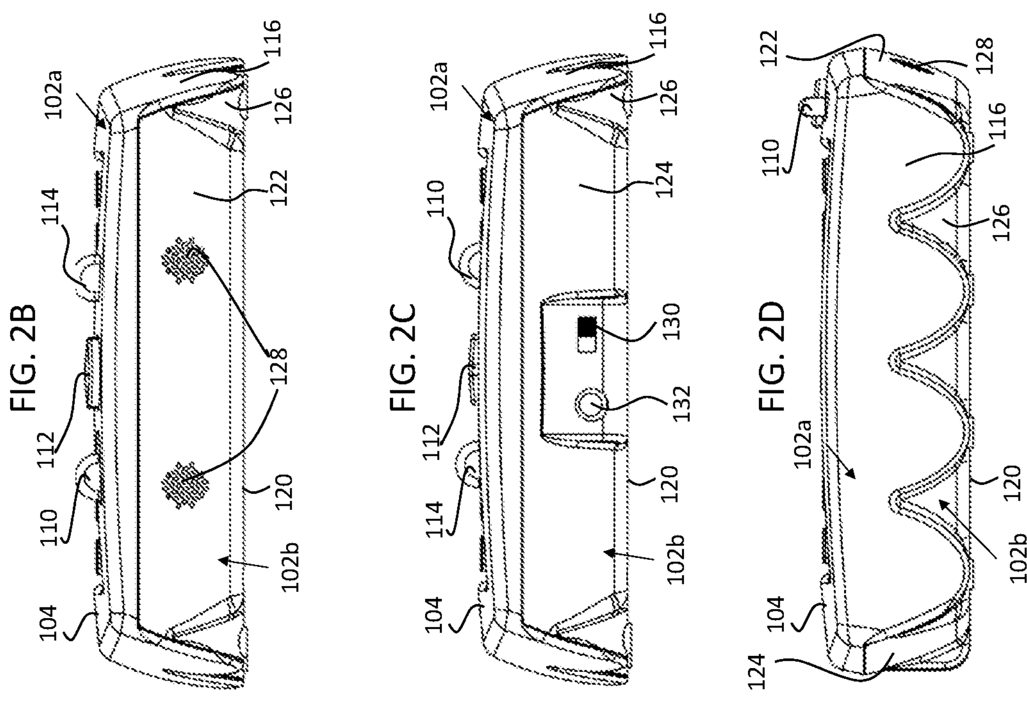
FIG. 2B
FIG. 2C
FIG. 2D
102a
104
110
112
114
116
122
126
128
120
102b
124
130
132

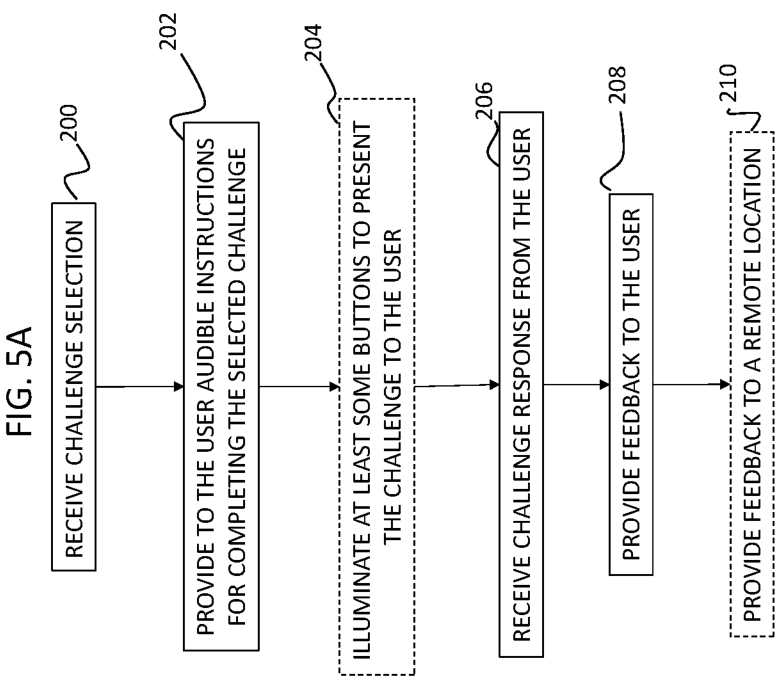
FIG. 5A
200
RECEIVE CHALLENGE SELECTION
202
PROVIDE TO THE USER AUDIBLE INSTRUCTIONS FOR COMPLETING THE SELECTED CHALLENGE
204
ILLUMINATE AT LEAST SOME BUTTONS TO PRESENT THE CHALLENGE TO THE USER
206
RECEIVE CHALLENGE RESPONSE FROM THE USER
208
PROVIDE FEEDBACK TO THE USER
210
PROVIDE FEEDBACK TO A REMOTE LOCATION

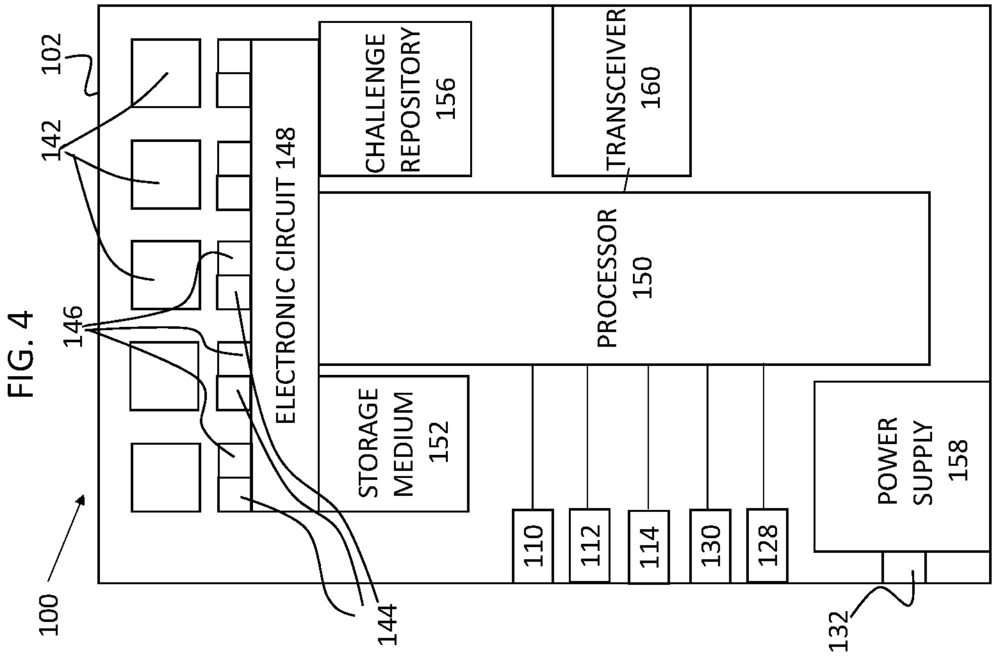
FIG. 4
100
102
142
146
144
ELECTRONIC CIRCUIT 148
CHALLENGE REPOSITORY 156
TRANSCEIVER 160
PROCESSOR 150
STORAGE MEDIUM 152
POWER SUPPLY 158
110
112
114
130
128
132

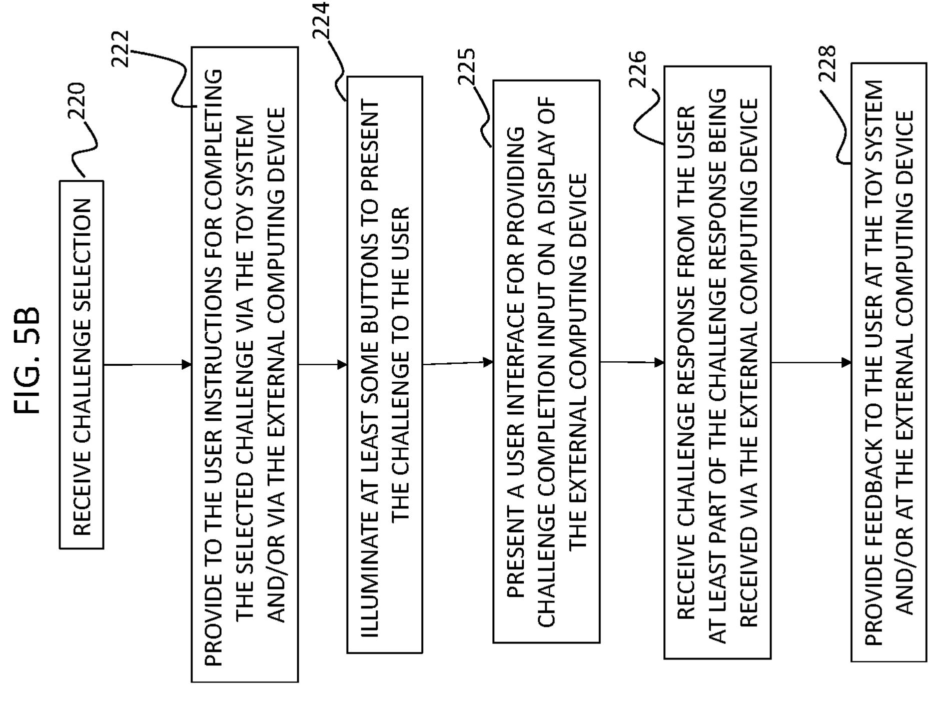
FIG. 5B
220
RECEIVE CHALLENGE SELECTION
222
PROVIDE TO THE USER INSTRUCTIONS FOR COMPLETING THE SELECTED CHALLENGE VIA THE TOY SYSTEM AND/OR VIA THE EXTERNAL COMPUTING DEVICE
224
ILLUMINATE AT LEAST SOME BUTTONS TO PRESENT THE CHALLENGE TO THE USER
225
PRESENT A USER INTERFACE FOR PROVIDING CHALLENGE COMPLETION INPUT ON A DISPLAY OF THE EXTERNAL COMPUTING DEVICE
226
RECEIVE CHALLENGE RESPONSE FROM THE USER AT LEAST PART OF THE CHALLENGE RESPONSE BEING RECEIVED VIA THE EXTERNAL COMPUTING DEVICE
228
PROVIDE FEEDBACK TO THE USER AT THE TOY SYSTEM AND/OR AT THE EXTERNAL COMPUTING DEVICE

INTERACTIVE ELECTRONIC TOY SYSTEM

FIELD AND BACKGROUND OF THE INVENTION

The invention, in some embodiments, relates to the field of electronic toys, and more specifically to an interactive electronic toy system having randomizable challenges, games and activities.

Many electronic toys exist, where there are multiple buttons, and each button the child presses causes something to occur. For example, such toys exist for teaching children animal sounds, instrument sounds, and the like. However, one disadvantage of these toys is that each time the child presses a button, the result is always the same. After a short play-time, the child typically gets bored with the toy, because he already knows exactly what will happen when each button is pressed, and/or where he needs to press to provide the correct answer to a question asked by the toy.

As such, there is a need in the art for an interactive electronic toy wherein play is less predictable, requiring the child to continue learning even during extended play, and as a result keeping the child's attention for a longer time.

SUMMARY OF THE INVENTION

In accordance with an embodiment of the teachings herein, there is provided an interactive electronic toy system, including:

- a challenge repository storing a plurality of challenges or games to be completed by a user using the interactive electronic toy system;
- a housing, including first and second housing portions attached to one another, such that a hollow is defined therebetween;
- a plurality of buttons, each of the buttons being selectively depressible and being accessible from an exterior of the housing, each of the buttons being at least partially transparent;
- a plurality of illuminators disposed within the hollow, such that each specific button of the plurality of buttons has at least one corresponding illuminator of the plurality of illuminators disposed thereunder, such that illumination of the at least one corresponding illuminator is visible through the specific button;
- a plurality of pressure sensors disposed within the hollow, each pressure sensor of the plurality of pressure sensors being disposed under, and being associated with, a corresponding one of the buttons, and is adapted to provide an electrical signal when the corresponding one of the buttons is depressed or released;
- a processor, functionally associated with the challenge repository, the plurality of illuminators, and the plurality of sensors;
- a non-transitory computer readable storage medium storing software modules including instructions to be executed by the processor, the non-transitory computer readable storage medium having stored:
  - instructions to receive a selection of a specific challenge;
  - instructions to provide to the user instructions for completing the specific challenge;
  - instructions to receive a challenge response from the user, in which the user responds to the specific challenge by at least one of moving the housing and depressing at least one of the plurality of buttons; and
  - instructions to provide feedback to the user, based on the received challenge response; and
- at least one power supply adapted to provide power to the plurality of illuminators, the plurality of pressure sensors, and the processor.

In some embodiments, the challenge repository includes a memory component disposed within the hollow of the housing. In some embodiments, the housing includes a slot for receiving a removable memory component, and wherein the challenge repository includes a removable memory component adapted to be inserted into the slot for association with the processor. In some embodiments, the interactive electronic toy system further includes a transceiver, and the challenge repository is remote from the housing and is in communication with the processor via the transceiver.

In some embodiments, the first housing portion includes a plurality of openings, each of the openings adapted to receive one of the plurality of buttons and to enable access thereto. In some other embodiments, the first housing portion includes at least one opening, adapted to receive at least two of the plurality of buttons and to enable access thereto.

In some embodiments, each button of the plurality of buttons is independently depressible, without affecting other buttons of the plurality of buttons.

In some embodiments, each of the plurality of illuminators is adapted to provide illumination in a plurality of colors. In some such embodiments, each of the plurality of buttons is associated with a single one of the plurality of illuminators, and each of the plurality of illuminators is associated with a single one of the plurality of buttons.

In some embodiments, each of the plurality of buttons has a group of illuminators of the plurality of illuminators disposed thereunder, each illuminator in the group of illuminators adapted to illuminate in a different color.

In some embodiments, the interactive electronic toy system further includes an orientation sensor, adapted to provide information regarding a three dimensional orientation of the housing. In some such embodiments, the instructions to receive the challenge response include instructions to receive at least one signal from the orientation sensor, indicative of the orientation of the housing as the user's response to the selected challenge.

In some embodiments, the interactive electronic toy system further includes a selection switch adapted for selection of a game to be played or of a challenge to be presented. In some embodiments, the interactive electronic toy system further includes a progress button adapted to enable progress between steps of a game or between levels. In some embodiments, the interactive electronic toy system further includes a volume control selector. In some embodiments, the interactive electronic toy system further includes an activation switch adapted to activate and deactivate the toy.

In some embodiments, the interactive electronic toy system further includes at least one audio speaker, functionally associated with the processor. In some embodiments, the instructions to provide to the user instructions for completing the specific challenge include instructions to provide audio instructions to the user, via the at least one audio speaker. In some embodiments, the instructions to provide feedback to the user include instructions to provide audio feedback to the user, via the at least one audio speaker.

In some embodiments, the instructions to provide to the user instructions for completing the specific challenge include instructions to present the specific challenge to the user by illuminating at least one of the illuminators.

In some embodiments, the instructions to provide feedback to the user include instructions to provide visual feedback to the user, via at least one of the illuminators. In some such embodiments, the visual feedback includes illumination of at least one of the illuminators. In some such embodiments, the visual feedback includes deactivation of at least one of the illuminators.

In some embodiments, the interactive electronic toy system further includes a transceiver. In some such embodiments, the instructions to receive the selection of the specific challenge include instructions to receive the selection from a second device, remote from the housing, via the transceiver. In some such embodiments, the instructions to provide feedback include instructions to provide the feedback to a second device, remote from the housing, via the transceiver.

In some embodiments, the specific challenge is selected from the group consisting of color identification challenges; shape identification challenges; letter identification challenges; number identification challenges; writing challenges; memory challenges; maze challenges; language challenges; math challenges; emotional intelligence challenges; music challenges; and coding challenges.

In some embodiments, the instructions to provide the specific challenge include instructions to randomize at least one aspect of the specific challenge.

In accordance with another embodiment of the teachings herein, there is provided a method of providing a challenge to a user using an interactive electronic toy including a housing and a plurality of buttons, each button associated with at least one illuminator and with at least one pressure sensor, the method including:

receiving a selection of a specific challenge, the specific challenge being selected from a challenge repository associated with the interactive electronic toy;

providing to the user instructions for completing the specific challenge;

receiving a challenge response from the user, in which the user responds to the specific challenge by at least one of moving the housing of the interactive electronic toy and depressing at least one of the plurality of buttons; and providing feedback to the user, based on the received challenge response.

In some embodiments, receiving the selection includes receiving the selection from a challenge repository formed as a removable memory component inserted into a corresponding slot in the housing of the interactive electronic toy. In some embodiments, the challenge repository is remote from the interactive electronic housing and receiving the selection includes receiving the selection from the remote challenge repository via a transceiver forming part of the interactive electronic toy.

In some embodiments, receiving the challenge response includes receiving a signal from at least one pressure sensor corresponding to the at least one of the plurality of buttons depressed by the user. In some embodiments, receiving the challenge response includes receiving an orientation signal from an orientation sensor forming part of the housing, the orientation signal indicative of an orientation of the housing as the user's response to the selected challenge.

In some embodiments, the method further includes receiving a selection of a game to be played or a challenge to be presented using a selection switch forming part of the housing. In some embodiments, the method further includes progressing between steps or levels of a game using a progress button forming part of or installed in the housing.

In some embodiments, providing to the user instructions for completing the specific challenge includes providing audio instructions to the user, via at least one audio speaker forming part of the interactive electronic toy. In some embodiments, providing feedback to the user includes providing audio feedback to the user, via the at least one audio speaker.

In some embodiments, the method further includes presenting the specific challenge to the user by illuminating at least one of the illuminators, prior to the receiving the challenge response.

In some embodiments, providing the feedback to the user includes providing visual feedback to the user, via at least one of the illuminators, the visual feedback including illuminating at least one of the illuminators or deactivating at least one of the illuminators.

In some embodiments, the interactive electronic toy is functionally associated with a second device, remote therefrom, and wherein providing the feedback includes providing the feedback to the second device via a transceiver.

In some embodiments, the specific challenge is selected from the group consisting of: color identification challenges; shape identification challenges; letter identification challenges; number identification challenges; writing challenges; memory challenges; maze challenges; language challenges; math challenges; emotional intelligence challenges; music challenges; and coding challenges.

In some embodiments, providing the specific challenge includes randomizing at least one aspect of the specific challenge.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures:

FIGS. 2A, 2B, 2C, and 2D are, respectively, top, front, back, and side plan view illustrations of the interactive electronic toy of FIG. 1;

FIG. 3 is a partially exploded view of the interactive electronic toy of FIG. 1;

FIG. 4 is a schematic block diagram of an interactive electronic toy according to embodiments of the teachings herein; and FIGS. 5A and 5B are flowcharts of two embodiments of exemplary methods of using the interactive electronic toys of FIGS. 1 to 4.

DESCRIPTION OF SOME EMBODIMENTS OF THE INVENTION

Figure 2A:
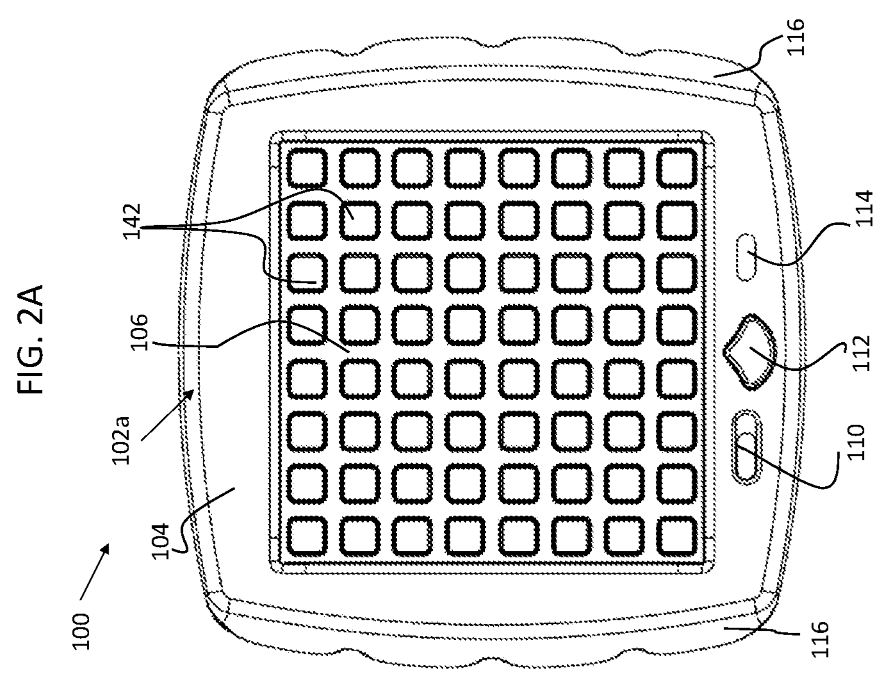

The invention, in some embodiments, relates to the field of electronic toys, and more specifically to an interactive electronic toy system having randomizable challenges, games and activities.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

The system and method described herein are intended to provide an interactive environment in which a user, typically a child, plays by pressing buttons on an electronic device. However, during each challenge or game, or each use of the device, different requirements are presented to the user, and different buttons have different effects. The effects of the buttons, and the specific locations the user must press, may be randomized.

For example, the interactive electronic toy may include a challenge in which the user is instructed to press all the buttons that appear green. The interactive electronic toy may then present a plurality of green buttons in a first set of locations on the device, and wait to sense that the user has pressed all the correct buttons. The challenge may then restart, only the green buttons will be in a second set of locations on the device, different from the first set of locations. As such, the user would not be able to remember which buttons he has to press, but rather would need to once again find the locations of the green buttons. Additional examples are provided hereinbelow.

Figure 1:
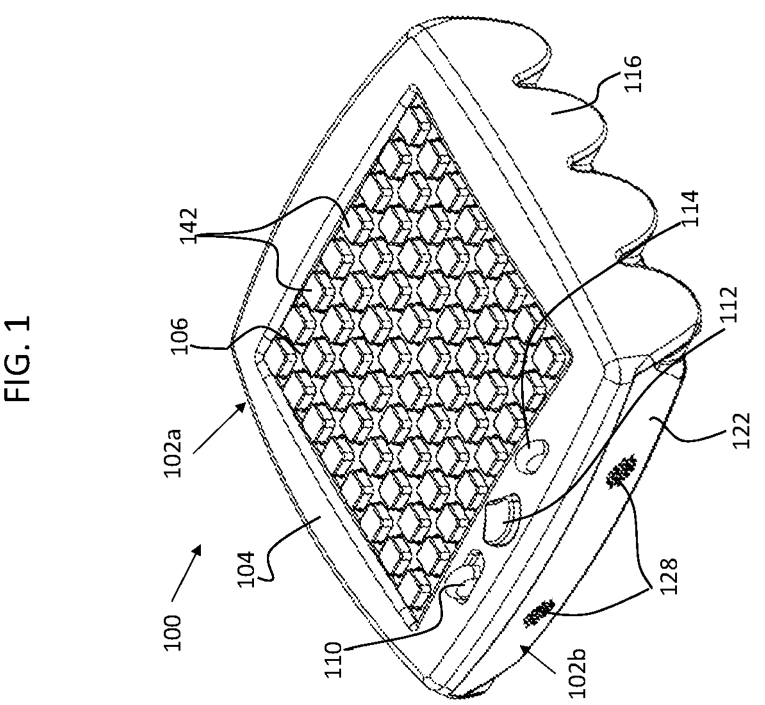
FIG. 1 is a perspective view illustration of an interactive electronic toy according to an embodiment of the teachings herein.

Reference is now made to FIG. 1, which is a perspective view illustration of an interactive electronic toy 100 according to an embodiment of the teachings herein, to FIGS. 2A, 2B, 2C, and 2D, which are, respectively, top, front, back, and side plan view illustrations of the interactive electronic toy 100, to FIG. 3, which is a partially exploded view of the interactive electronic toy 100, and to FIG. 4, which is a schematic block diagram of an interactive electronic toy according to embodiments of the teachings herein.

As seen in FIGS. 1, 3 and 4, interactive electronic toy 100 includes a housing 102 (FIG. 4), typically including an upper housing portion 102*a* and a lower housing portion 102*b*, which form a hollow therebetween.

Upper housing portion 102*a* includes an upper surface frame 104, which has disposed therein a button receiving surface 106, which includes a grid of openings 108 for receiving buttons as described hereinbelow. Disposed on a front side of upper surface frame 104 is a selector switch 110 adapted for selection of a game to be played, or of a challenge to be presented, a progress button 112, adapted to enable a user to progress between steps of a game, or between levels of a game, and a volume control 114. For example, in a game in which the user is required to identify numbers, progress button 112 may be used to skip the lower numbers with which the user is already familiar, and bring the user directly to identification of higher numbers (e.g. 6, 7, 8) which the user still needs to master.

Extending downwardly from upper surface frame 104, on two opposing sides thereof, are side surfaces 116. In some embodiments, the side surfaces are shaped and configured such that the toy 100 has a specific appearance, for example that of an animal. In such embodiments, a lower end of side surfaces 116 may have a specific contour, selected for creating the specific appearance. In the illustrated embodiment, the specific contour is wavy, such that the shape of the entire toy 100 is reminiscent of that of a caterpillar.

Lower housing portion 102*b* includes a bottom surface 120. A front surface 122 and a back surface 124 extend upwardly from bottom surface 120, toward upper surface frame 104. Extending sideway from bottom surface 120, and in some embodiments partially upward, are side bases 126, configured to engage side surfaces 116 of upper housing portion 102*a*. As seen in FIG. 1, when upper housing portion 102*a* is connected to lower housing portion 102*b*, a closed structure is formed, preventing the user from accessing the interior of the housing.

Front surface 122 of lower housing portion 102*b* includes at least one audio speaker 128, here illustrated as a pair of audio speakers. Audio speakers 128 are adapted to provide audio instructions to the user, as explained in further detail hereinbelow.

Back surface 124 of lower housing portion 102*b* includes an activation switch 130 adapted to activate and deactivate the toy, as well as a port 132 for connection of toy 100 to an external power source, such as an electric socket, either for powering of toy 100 or for charging of a battery thereof, as explained in further detail hereinbelow. In some embodiments, switch 130 may be a three step switch including an "off" position, an "on low volume" position, and an "on high volume" position. In some such embodiments, volume control 114 may be obviated.

A button surface 140 is disposed within the hollow of toy 100, and includes a plurality of depressible buttons 142. In some embodiments, such as the illustrated embodiments, there may spaces between buttons 142. As seen in FIG. 1, button surface 140 is arranged such that each of buttons 142 extends through a corresponding opening 108 of button receiving surface 106. In some embodiments, not illustrated, the buttons 142 may be very close to each other, or even touching each other, provided that the buttons 142 can each be depressed individually without impacting adjacent buttons. In some such embodiments, button receiving surface 106 may include a single large opening 108, such that all the buttons together are disposed within the single large opening 108.

Disposed beneath each one of buttons 142 is at least one corresponding illuminator 144, such as an LED light. The buttons 142 are at least partially transparent, such that, during operation of a specific illuminator 144 beneath a specific button 142, the button appears illuminated. In some embodiments, each illuminator 144 is adapted to provide illumination in a plurality of colors. In other embodiments, each button 142 has a plurality of illuminators disposed thereunder, each of the plurality of illuminators adapted to illuminate in a different color. In some embodiments, each one of illuminators 144 corresponds to a single button 142, such that a one-to-one relationship exists between each illuminator 144 and a button 142. In other embodiments, or in some play modes, the illuminators 144 may be decoupled from the buttons 142.

Disposed beneath each one of buttons 142 is also at least one corresponding sensor 146, such as a pressure sensor adapted to provide an electric signal when the overlying button 142 is depressed. Each one of sensors 146 corresponds to a single button 142, such that a one-to-one relationship exists between each sensor 146 and a button 142.

An electronic circuit 148 is disposed within the hollow of toy 100 and has illuminators 144 and sensors 146 disposed thereon. Electronic circuit 148 also connects audio speakers 128 and switches 110, 112, 114, and 130 to a processor 150, shown clearly in FIG. 4, which may be mounted onto electronic circuit 148 or onto a dedicated printed circuit board (not explicitly shown). Processor 150 is adapted to control operation of toy 100, as explained in further detail hereinbelow with respect to FIGS. 5A and 5B. Processor 150 is functionally associated with a non-transitory computer readable storage medium 152, shown clearly in FIG. 4, storing software modules including instructions to be executed by the processor 150. Storage medium 152 may be disposed on electronic circuit 148, on a separate printed circuit board also holding processor 150, or on a dedicated printed circuit board (not explicitly shown).

Toy 100 further includes, or is functionally associated with, at least one challenge repository 156 storing challenges and/or games to be implemented by processor 150 and present to the user via audio speakers 128 and buttons 142.

The challenge repository 156 may be any suitable storage element for storing digital data, such as a database, a computer memory, or a buffering memory. The challenge repository 156 may be local to toy 100. For example, the challenge repository 156 may be in the form of a data storage element, such as a removable memory card inserted into a dedicated slot (not shown) in toy 100 or a database or memory component built into toy 100. For example, storage repository 156 may be mounted onto electronic circuit 148, or onto another printed circuit board (for example the circuit board holding processor 150). In some embodiments, the challenge repository 156 may be remote from toy 100. For example, challenge repository 156 may be a database located remotely from toy 100 and communicating therewith, for example with processor 150, via a network.

In some embodiments, the challenge repository 156 is adapted to store, at least temporarily, large amounts of data, in the range of 5 MB to 500 MB. In embodiments in which the challenge repository 156 is local to toy 100, it enables toy 100 to operate even when not in communication with a network or with another remote device. The challenge repository 156 may be volatile or non-volatile memory, such as a flash memory device, retaining the stored data, even when the power is switched off and on, thus accelerating the device start up time.

In some embodiments, toy 100 further includes at least one orientation sensor (not explicitly shown), such as an accelerometer. The orientation sensor is adapted to provide to processor 150 information regarding a three dimensional spatial orientation of toy 100 (for example in terms of roll, pitch, and yaw), which information may be used to determine whether or not the user has met a specific challenge or completed a specific game, as explained in further detail hereinbelow.

One or more power supplies 158 are adapted to provide power to toy 100 and to components thereof, including audio speakers 128, illuminators 144, sensors 146, processor 150 and/or challenge repository 156. Power supply 158 may be any suitable power supply, such as a battery or a rechargeable battery, for example chargeable via port 132, or an external power source to which toy 100 is connected via port 132. In some embodiments, toy 100 is portable, and is designed to be operable without connection to an external power source, or at a distance greater than 1 meter from an external power source, for extended durations of time, in the range of 1-4 hours of non-stop operation.

In some embodiments, toy 100 may further include a transceiver 160, shown in FIG. 4, enabling two way communication with a networked environment, for example via a Local Area Network (LAN), a Wide Area Network (WAN), or via the Internet. The two-way communication may be wired communication or wireless communication, and may use any suitable protocol known in the art. In such embodiments, power supply 158 provides power also to the transceiver.

The transceiver is particularly useful when the challenge repository 156 is remote from toy 100, such that a challenge may be selected from the challenge repository 156 and provided to processor 150 via the transceiver.

In some embodiments, toy 100 may be functionally associated with an external computing device (not explicitly shown), such as a tablet computer, a laptop computer, or a smartphone, via transceiver 160. In some such embodiments, a user interface of the external computing device (for example forming part of a dedicated application which interfaces with toy 100) may receive user input, which may be transmitted from the external computing device to processor 150 for controlling operation of toy 100, and/or for responding to a specific game or challenge currently being completed using toy 100. Processor 150 may also provide an output, such as a challenge completion feedback output, to the external computing device, for example via transceiver 160.

In some embodiments, toy 100 may further include an inactivity sensing functionality adapted to identify when the toy 100 has been inactive for a predetermined duration, and to provide such information to processor 150 for adapting operation of toy 100 so as to preserve power consumption by the toy 100 when it is inactive.

In some embodiments, in response to detection of inactivity by the inactivity sensing functionality, processor 150 may run a low power efficiency power scheme adapted to conserve power in toy 100, and/or may provide an audio indication to the user that the toy has been inactive and is shutting down.

In some embodiments, the toy 100 may further include a thermal sensor, adapted to provide input to processor 150 when a temperature level in toy 100 exceeds a predetermined threshold. The processor 150 may then operate a temperature control module to adjust the operation of toy 100 to the elevated temperature level, for example by shutting down toy 100, or by notifying the user of the elevated temperature, thereby to provide for safe and robust device operation.

Reference is now additionally made to FIGS. 5A and 5B, which are flowcharts embodiments of exemplary methods of using the interactive electronic toy 100 of FIGS. 1 to 4.

In the flowchart of FIG. 5A, all user interaction, once the challenge or game is selected, is with toy 100. As seen in FIG. 5A, at step 200 a selection of a challenge or game to be accomplished by the user is received by processor 150, for example implementing instructions to receive such a selection from storage medium 152. The challenge is typically selected from challenge repository 156. In some embodiments, the challenge is selected using selector 110 of upper housing portion 102*a*.

In some embodiments, the challenge repository 156 may include a single challenge, and selection of the challenge may be carried out by associating the challenge repository with processor 150. For example, the challenge repository may be a computer storage drive, such as an SD card, USB drive, or the like, including a single challenge. As such, the challenge is selected by selecting a suitable challenge repository and inserting it into a suitable slot or port in toy 100, so as to associate the computer storage drive with processor 150.

In some embodiments, the challenge repository is local to toy 100, for example forming part of electronic circuit 148 thereof, or associated with the processor 150 by insertion into a dedicated port as described hereinabove.

In other embodiments, the challenge repository 156 may be remote from toy 100, for example located on an external server or computing device. In such embodiments, the challenge may be selected by user interaction with a user interface of the external server or computing device, and the selected challenge may be transmitted to processor 150, for example via transceiver 160.

The challenge may be any suitable challenge or game which may be provided to the user by toy 100, as described herein. In some embodiments, the challenge may include any one or more of the following types of challenges:

Color identification challenges;
Shape identification challenges;
Letter identification challenges;
Number identification challenges;
Writing challenges;
Memory challenges;
Maze challenges;
Language challenges;
Math challenges;
Emotional Intelligence challenges;
Music challenges; and
Coding challenges.

Instructions for completing the challenge, are provided to the user, typically via audio speakers 128, at step 202, for example by processor 150 implementing instructions to provide such user instructions from storage medium 152.

In a first, color identification challenge example, in which the user must press all the buttons illuminated in a specific color (e.g. green), the instructions may be provided by the audio speakers providing the sentence "Press all the green buttons!". The specific color to be identified may be selected by the processor 150 at the time of providing the instructions, for example in a random manner.

In a second, shape identification challenge example, in which the user must press all the illuminated buttons that form a specific shape (e.g. square), the instructions may be provided by the audio speakers providing the sentence "Press all the buttons which together form a square!". The specific shape to be identified may be selected by the processor 150 at the time of providing the instructions, for example in a random manner.

In a third, writing challenge example, in which the user must press buttons to form a specific letter, the instructions may be provided by the audio speakers providing the sentence "Press buttons to form an upper case letter 'L'". The specific letter to be written may be selected by the processor 150 at the time of providing the instructions, for example in a random manner.

In a fourth, memory challenge example, in which the user must remember the locations of all the buttons that were illuminated in a specific color (e.g. red), the instructions may be provided by the audio speakers providing the sentence "Look closely at the buttons and remember which ones are red. After the lights turn off, press all the buttons that were red!". The specific color to be memorized may be selected by the processor 150 at the time of providing the instructions, for example in a random manner.

In a fifth, maze challenge example, in which the user must tilt the device so a light moves along a specific path, the instructions may be provided by the audio speakers providing the sentence "Tilt your toy to move the yellow dot from the green square to the red square, without bumping into blue walls". The specific lengths and locations of the blue walls, as well as the specific colors used for the walls, beginning and end points, and for the element traversing the maze, may be selected by the processor 150 at the time of providing the instructions, for example in a random manner.

In a sixth, coding challenge example, in which the user must move a light along a specific path, the instructions may be provided by the audio speakers providing the sentence "Use the operation buttons to create instructions for moving the yellow dot from the green square to the red square, without bumping into blue walls, and then see whether your plan worked by executing your instructions". The specific lengths and locations of the blue walls, as well as the specific colors used for the walls, beginning and end points, and for the element traversing the maze, may be selected by the processor 150 at the time of providing the instructions, for example in a random manner.

In some embodiments, at step 204, at least some buttons 142 of toy 100 are illuminated, so as to present the challenge to the user, for example by processor 150 implementing instructions from storage medium 152 to illuminate specific buttons in specific colors. In some embodiments, the number of buttons to be illuminated and/or the locations of the buttons to be illuminated, may be at least partially randomized. Returning to the examples provided hereinabove:

In the first example, all the buttons 142 are illuminated, such that only a subset of the buttons are illuminated in green and the remaining buttons are illuminated in other colors. The specific number of buttons illuminated in green, and the specific locations of the buttons illuminated in green, may be selected by processor 150 at random, in real time when presenting the challenge to the user.

In the second example, selected buttons 142 are illuminated to show multiple shapes, for example a red triangle, a blue square, and a green rectangle. The specific colors of the illuminated shapes, dimensions of the illuminated shapes, and locations of the illuminated shapes may be selected by processor 150 at random, in real time when presenting the challenge to the user.

In the fourth example, all the buttons 142 are illuminated, such that only a subset of the buttons are illuminated in red and the remaining buttons are illuminated in other colors. The specific number of buttons illuminated in red, and the specific locations of the buttons illuminated in red, may be selected by processor 150 at random, in real time when presenting the challenge to the user. Following a predetermined duration allowing the user to memorize the locations of the red buttons, the processor 150 controls illuminators 144 to turn off the illuminating beneath all buttons 142.

In the fifth example, some buttons 142 are illuminated in blue to form "walls", a single button 142 is illuminated in green and another single button 142 is illuminated in red, to form the maze's beginning and end points, and a third single button 142 is illuminated in yellow to form the dot that has to traverse the maze. The specific number of buttons forming "walls", and the specific locations of the illuminated buttons, may be selected by processor 150 at random, in real time when presenting the challenge to the user.

In the sixth, coding challenge example, some buttons 142 are illuminated in blue to form "walls", a single button 142 is illuminated in green and another single button 142 is illuminated in red, to form the maze's beginning and end points, and a third single button 142 is illuminated in yellow to form the dot that has to traverse the maze. Additionally, some buttons are illuminated to form operation buttons—for example some of the buttons may be step buttons used to code the sequence of movements or operations the yellow dot must accomplish to complete the maze, and another implementation button representing “move the dot according to the coded sequence”. In one embodiment, the step buttons may include “walk left one step”, “walk right one step”, “walk up one step”, and “walk down one step” buttons. In another embodiment, the step buttons may include “walk forward one step”, “turn 90 degrees to the right” and “turn 90 degrees to the left” buttons. The specific number of buttons forming “walls”, and the specific locations of the illuminated buttons, may be selected by processor 150 at random, in real time when presenting the challenge to the user.

In other embodiments, in which the challenge instructs the user to press specific buttons to cause them to be illuminated, rather than starting the challenge with illuminated buttons, step 204 may be obviated. Referring back to the third example above, since the user is instructed to press the buttons to write the letter ‘L’, none of buttons 142 are initially illuminated.

Following providing of the challenge to the user, at step 206 processor 150 receives a challenge response from the user, which response is received by receipt of a signal from one or more sensors. For some challenges, such as the challenges of the first, second, third, fourth, and sixth examples above, the response is received by receiving signals from one or more sensors 146 that buttons 142 corresponding thereto have been depressed by the user.

In some cases, the challenge response received from the user is stored for providing a later feedback. For instance, in the sixth coding example, the challenge response includes receiving a sequence signals from sensors associated with the step buttons, in which the user is indicating how the yellow dot should move. For example, the sequence may include 3 steps upwards, 4 steps left, 2 steps down, 3 steps left. Typically, the challenge response further includes receiving a signal from a sensor associated with implementation button, following the sequence of signals associated with the step buttons.

For some challenges, such as the challenge of the fifth example above, the response is received by receiving signals from the orientation sensor that the orientation of toy 100 has been changed in a specific way.

At step 208, processor 150 provides feedback to the user, based on the received response. The feedback may include de-illumination of one or more buttons 142, illuminating one or more buttons 142, and/or providing audio feedback via audio speakers 128. In some embodiments, the feedback is provided each time the user depresses a button. In other embodiments, the feedback is provided only following completion of the entire challenge.

Returning to the examples provided hereinabove:

In the first example, the processor may provide feedback to the user by de-illuminating all green buttons pressed by the user, by providing a confirming audible sound, e.g. a sound of clapping hands, when a green button is pressed, and/or by providing a negative or rejecting audible sound when a button of another color is pressed.

In the second example, the processor may provide feedback to the user by de-illuminating buttons belonging to the square, when those are depressed by the user, by providing a confirming audible sound when one of the buttons belonging to the square is depressed or when all the buttons belonging to the square are depressed, and/or by providing a negative or rejecting audible sound when a button of another shape is pressed.

In the third example above, the processor may provide feedback to the user by illuminating buttons depressed by the user in the process of forming the letter ‘L’, and/or by providing a confirming audible sound when the set of depressed buttons forms the letter ‘L’.

In the fourth example, the processor may provide feedback to the user by re-illuminating buttons pressed by the user that were initially illuminated in red, by providing a confirming audible sound when the user depresses a button that was initially illuminated in red (i.e. remembering where the red button was), and/or by providing a negative or rejecting audible sound when the user depresses a button that was initially illuminated in a color other than red (i.e. misremembering where the red buttons were).

In the fifth example, the processor receives signals from the accelerometer indicating that the user is tilting toy 100. As feedback, the processor may cause the button currently illuminated in yellow to be de-illuminated, and an adjacent button (in the direction of tilting of toy 100) to be illuminated in yellow, thereby “moving” the yellow “dot” along the maze in accordance with directions in which the user tilts toy 100. Additionally, the processor may provide feedback by providing a confirming audible sound when the user tilts the toy to “move” the yellow dot in the correct direction or when the user has managed to get the yellow dot to traverse the entire maze, and/or by providing a negative or rejecting audible sound when the user “moves” the yellow dot in the wrong direction or causes the yellow dot to “bump into a wall”.

In the sixth, coding challenge example, the feedback may be provided in response to receipt of the signal from the sensor associated with the implementation button. As feedback, the processor may cause the button currently illuminated in yellow to be de-illuminated, and an adjacent button to be illuminated in yellow in a direction determined according to the instructions provided by the user in the sequence of signals received from the step buttons, thereby “moving” the yellow “dot” along the maze in accordance with the steps coded by the user. Additionally, the processor may provide feedback by providing a confirming audible sound when the instructions coded by the user successfully “move” the yellow dot through the entire maze, and/or by providing a negative or rejecting audible sound when the instructions coded by the user cause the yellow dot to “bump into a wall”.

In some embodiments, feedback regarding completion of the challenge may also be provided to a remote device or location, such as a device operated by a parent, teacher, therapist, or other guide, at optional step 210. Such feedback may be provided from processor 150 via the transceiver.

It is a particular feature of the present invention that, upon completion of a challenge, if the user selects to repeat the same challenge or type of challenge, processor 150 presents the same type of challenge but changed in some way.

In some embodiments, the changes may be a result of randomization of the creation of challenges. In other embodiments, the changes may be a result of a specific challenge or game being repeated multiple times in sequence, in which case the processor may increase the difficulty of the challenges. In such embodiments, memory component 152 may include a learning module, instructing processor 150 to periodically or continuously learn the level at which the user completes challenges, so as to provide challenges at a higher difficulty level when a challenge is successfully completed, or to make the challenge easier if the user is having trouble completing the challenge.

Using the first example hereinabove, upon the user requesting to repeat the challenge a second time processor 150 may change the color of the buttons to be identified and depressed by the user, the locations of the buttons to be identified and depressed by the user, and/or the number of buttons to be identified and depressed by the user. As another alternative for the first example, in the first time the user completes the challenge, all the buttons are illuminated only in two strongly contrasting colors, making it easier to find the green buttons, and in a subsequent completion of the challenge the buttons are illuminated in less strongly contrasting colors and/or in many colors, making it more difficult to find the green buttons and increasing the level of the challenge.

Turning to FIG. 5B, the figure relates to an embodiment in which part of the user interaction is via an external computing device, such as a tablet computer or smartphone, typically running a suitable software application dedicated for interaction with toy 100. As explained in further detail hereinbelow, in such embodiments, the user may provide user input also via the user interface of the external computing device.

As seen in FIG. 5B, at step 220 a selection of a challenge or game to be accomplished by the user is received by processor 150. As described hereinabove with respect to step 200 of FIG. 5A, the challenge may be received from a local or from a remote challenge repository, and may include any suitable challenge or game.

The method illustrated in FIG. 5B will be described hereinbelow with respect to the exemplary coding challenge provided hereinabove.

Instructions for completing the challenge are provided to the user at step 222. In some embodiments, the instructions may be provided via audio speakers 128 of toy 100, as described hereinabove with respect to step 202 of FIG. 5A. In some embodiments, the instructions may also, or alternatively, be provided via a user interface element of the external computing device, such as being provided via audio speakers of the external computing device or being displayed on a display-screen of the external computing device.

Returning to the coding challenge example provided hereinabove with respect to FIG. 5A, in some embodiments the instructions may be provided by the audio speakers 128 and/or the audio speakers of the remote computing device providing the sentence "Use the operation buttons to create instructions for moving the yellow dot from the green square to the red square, without bumping into blue walls, and then see whether your plan worked by executing your instructions". In some embodiments, the instructions may be displayed visually (in writing, drawings, icons, or an animated example) on the display-screen of the external computing device.

As discussed hereinabove, the specific lengths and locations of the blue walls, as well as the specific colors used for the walls, beginning and end points, and for the element traversing the maze, may be selected by the processor 150 and/or by a processor of the remote computing device at the time of providing the instructions, for example in a random manner.

In some embodiments, at step 224, at least some buttons 142 of toy 100 are illuminated, so as to present the challenge to the user, substantially as described hereinabove.

In the coding challenge example, some buttons 142 are illuminated in blue to form "walls", a single button 142 is illuminated in green and another single button 142 is illuminated in red, to form the maze's beginning and end points, and a third single button 142 is illuminated in yellow to form the dot that has to traverse the maze. The specific number of buttons forming "walls", and the specific locations of the illuminated buttons, may be selected by processor 150 at random, in real time when presenting the challenge to the user. In some embodiments, the illuminated buttons may additionally include a specific "complete coding" button 142 (e.g. illuminated in another color, such as black), to be used once coding is complete to determine whether the coding was correct.

At step 225, a user interface for providing challenge completion input is displayed to the user on the display-screen of the remote computing device. In the coding example being used herein, the user interface may include operation interface elements (e.g. icons or buttons). For example some of the interface elements may be step icons used to code the sequence of steps the yellow dot must accomplish to complete the maze. Another interface element may be a "complete coding" icon. In one embodiment, the step icons may include "walk left one step", "walk right one step", "walk up one step", and "walk down one step" icons. In another embodiment, the step icons may include "walk forward one step", "turn 90 degrees to the right" and "turn 90 degrees to the left" icons.

Following providing of the challenge and the user interface to the user, at step 226 processor 150 receives a challenge response from the user, at least part of which response is received via transceiver 160 from the external computing device. In some embodiments, some of the response is received by receipt of a signal from one or more of sensors of toy 100, as described hereinabove with respect to FIG. 5A.

In the current coding example, the user may provide the challenge response input by engaging the step icons in a specific sequence, indicating how the yellow dot should traverse the maze. For example, the sequence may include engaging the step upwards icon 3 times, engaging the step left icon 4 times, engaging the step down icon 2 times, and engaging the step left icon 3 times. Once the user has coded the method for the yellow dot to traverse the maze, the user provides a "complete coding" input, either by engaging the corresponding icon on the user interface of the external computing device, or by pressing the corresponding button 142 on toy 100. Subsequently, the coded sequence of instructions generated by the user using the step icons is transmitted from the external computing device to processor 150, for example via transceiver 160.

At step 228, processor 150 provides feedback to the user, based on the received response. The feedback may include de-illumination of one or more buttons 142, illuminating one or more buttons 142, providing audio feedback via audio speakers 128 and/or providing feedback via the user interface of the external computing device In the coding challenge example, the feedback may be provided in response to receipt of the "complete coding" signal. As feedback, the processor may cause the button 142 currently illuminated in yellow to be de-illuminated, and an adjacent button to be illuminated in yellow in a direction determined according to the coded sequence of steps, thereby "moving" the yellow "dot" along the maze in accordance with the steps coded by the user. Additionally, the processor may provide feedback by providing a confirming audible sound when the instructions coded by the user successfully "move" the yellow dot through the entire maze, and/or by providing a negative or rejecting audible sound when the instructions coded by the user cause the yellow dot to "bump into a wall".

In some embodiments, feedback regarding completion of the challenge may also be provided to, or via, the external computing device.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An interactive electronic toy system, comprising:
- a challenge repository storing a plurality of challenges or games to be completed by a user using the interactive electronic toy system;
- a housing, including first and second housing portions attached to one another, such that a hollow is defined therebetween;
- a plurality of buttons, each of said buttons being selectively depressible and being accessible from an exterior of said housing, each of said buttons being at least partially transparent, wherein the plurality of buttons are devoid of images displayed thereon;
- a plurality of illuminators disposed within said hollow, such that each specific button of said plurality of buttons has at least one corresponding illuminator of said plurality of illuminators disposed thereunder, such that illumination of said at least one corresponding illuminator is visible through said specific button;
- a plurality of pressure sensors disposed within said hollow, each pressure sensor of said plurality of pressure sensors being disposed under, and being associated with, a corresponding one of said buttons, and is adapted to provide an electrical signal when said corresponding one of said buttons is depressed or released;
- a processor, functionally associated with said challenge repository, said plurality of illuminators, and said plurality of sensors;
- a non-transitory computer readable storage medium storing software modules including instructions to be executed by said processor, said non-transitory computer readable storage medium having stored:
  - instructions to receive a selection of a specific challenge;
  - instructions to present said specific challenge to the user, by illuminating a subset of said plurality of buttons;
  - instructions to receive a challenge response from the user, in which the user responds to said specific challenge by at least one of moving said housing and depressing at least one of said plurality of buttons; and
  - instructions to provide feedback to the user, based on said received challenge response; and
- at least one power supply adapted to provide power to said plurality of illuminators, said plurality of pressure sensors, and said processor,
- wherein said instructions to present said specific challenge to the user comprise instructions to change the effect of at least one of said plurality of buttons between a first instance of presenting said specific challenge and a second subsequent instance of presenting said specific challenge.

2. The interactive electronic toy system of claim 1, wherein said first housing portion includes a plurality of openings, each of said openings adapted to receive one of said plurality of buttons and to enable access thereto.

3. The interactive electronic toy system of claim 1, wherein said first housing portion includes at least one opening, adapted to receive at least two of said plurality of buttons and to enable access thereto.

4. The interactive electronic toy system of claim 1, wherein each of said plurality of illuminators is adapted to provide illumination in a plurality of colors.

5. The interactive electronic toy system of claim 1, wherein each of said plurality of buttons has a group of illuminators of said plurality of illuminators disposed thereunder, each illuminator in said group of illuminators adapted to illuminate in a different color.

6. The interactive electronic toy system of claim 1, further comprising an orientation sensor, adapted to provide information regarding a three-dimensional orientation of said housing,
- wherein said instructions to receive said challenge response include instructions to receive at least one signal from said orientation sensor, indicative of the orientation of said housing as the user's response to said selected challenge.

7. The interactive electronic toy system of claim 1, further including a progress button adapted to enable progress between steps of said selected challenge or between levels of a challenge or game.

8. The interactive electronic toy system of claim 1, wherein said instructions to provide feedback to the user comprise instructions to provide visual feedback to the user, via at least one of said illuminators, said visual feedback comprising at least one of illumination of at least one of said illuminators or deactivation of at least one of said illuminators.

9. The interactive electronic toy system of claim 1, further comprising a transceiver, wherein said instructions to receive said selection of said specific challenge comprise instructions to receive said selection from a second device, remote from said housing, via said transceiver.

10. The interactive electronic toy system of claim 1, further comprising a transceiver, wherein said instructions to provide feedback comprise instructions to provide said feedback to a second device, remote from said housing, via said transceiver.

11. The interactive electronic toy system of claim 1, wherein said instructions to provide said specific challenge include instructions to randomize at least one aspect of said specific challenge.

12. A method of providing a challenge to a user using an interactive electronic toy including a housing and a plurality of buttons, each button associated with at least one illuminator and with at least one pressure sensor, the method comprising:

receiving a selection of a specific challenge, said specific challenge being selected from a challenge repository associated with the interactive electronic toy;

presenting said specific challenge to the user by illuminating at least some of said plurality of buttons;

receiving a challenge response from the user, in which the user responds to said specific challenge by at least one of moving the housing of the interactive electronic toy and depressing at least one of the plurality of buttons; and providing feedback to the user, based on said received challenge response, wherein the only visual indication provided to the user for completion of said specific challenge is by illumination and de-illumination of said plurality of buttons, wherein said plurality of buttons are devoid of any images displayed thereon, and wherein said presenting said specific challenge to the user comprises assigning a first effect to a specific one of said plurality of buttons during a first presentation of said specific challenge, and assigning a different effect to said specific one of said plurality of buttons during a second presentation of said specific challenge.

13. The method of claim 12, wherein said receiving said selection comprises receiving said selection from a challenge repository formed as a removable memory component inserted into a corresponding slot in the housing of the interactive electronic toy.

14. The method of claim 12, wherein said challenge repository is remote from the interactive electronic housing and said receiving said selection comprises receiving said selection from said remote challenge repository via a transceiver forming part of the interactive electronic toy.

15. The method of claim 12, wherein said receiving said challenge response comprises receiving a signal from at least one pressure sensor corresponding to said at least one of the plurality of buttons depressed by the user.

16. The method of claim 12, wherein said receiving said challenge response comprises receiving an orientation signal from an orientation sensor forming part of said housing, said orientation signal indicative of an orientation of said housing as the user's response to said selected challenge.

17. The method of claim 12, wherein said providing said feedback to the user comprises providing visual feedback to the user, via at least one of the illuminators, said visual feedback including illuminating at least one of the illuminators or deactivating at least one of the illuminators.

18. The method of claim 12, wherein the interactive electronic toy is functionally associated with a second device, remote therefrom, and wherein said providing said feedback comprises providing said feedback to said second device via a transceiver.

19. The method of claim 12, wherein said providing said specific challenge includes randomizing at least one aspect of said specific challenge.

* * * * *